United States Patent [19]
Sakawaki et al.

[11] Patent Number: 5,330,680
[45] Date of Patent: Jul. 19, 1994

[54] FOLIATED FINE GRAPHITE PARTICLES AND METHOD FOR PREPARING SAME

[75] Inventors: Kouji Sakawaki; Yuji Yoshizumi; Yutaka Yamashita, all of Kitakyushu, Japan

[73] Assignee: Mitsui Mining Company, Limited, Tokyo, Japan

[21] Appl. No.: 947,879

[22] Filed: Sep. 21, 1992

Related U.S. Application Data

[63] Continuation of Ser. No. 460,096, Feb. 2, 1990, abandoned.

[30] Foreign Application Priority Data

Jun. 8, 1988 [JP] Japan .................. 63-139483

[51] Int. Cl.$^5$ .................. B01J 13/00; C01B 31/04
[52] U.S. Cl. .................. 252/309; 252/378 R; 252/313.1; 423/448; 423/447.2; 204/157.42; 106/472; 241/2
[58] Field of Search .................. 252/313.1, 308, 309, 252/378 R; 423/448, 460, 447.2; 204/157.42; 428/408; 241/2; 106/472

[56] References Cited

U.S. PATENT DOCUMENTS

| 4,400,433 | 8/1983 | Ishiguro et al. ............ 428/408 |
| 4,801,403 | 1/1989 | Lu et al. ............ 252/378 R |
| 5,186,919 | 2/1993 | Bunnell ............ 423/448 OR |

FOREIGN PATENT DOCUMENTS

| 238781 | 9/1987 | European Pat. Off. . |
| 240845 | 9/1985 | German Democratic Rep. . |

OTHER PUBLICATIONS

Derwent Abstract, AN 87-272328/39.
Derwent Abstract, AN 81-93622D/51.
Derwent Abstract, AN 86-194044/30.
Patent Abstracts of Japan, vol. 5, No. 133 (E-071), Aug. 25, 1981 (JP-A-56071245).
World Patents Index, Week 37, Accession No. 76-69632x (JP-A-51087176).
Patent Abstracts of Japan, vol. 4, No. 93 (C-017), Jul. 7, 1980 (JP-A-55058271).

*Primary Examiner*—Richard D. Lovering
*Assistant Examiner*—Daniel S. Metzmaier
*Attorney, Agent, or Firm*—Millen, White, Zelano & Branigan

[57] ABSTRACT

This invention relates to a method for preparing fine graphite particles which can be used as a highly functional graphite material in wide applications. According to this method, foliated fine graphite particles having a high aspect ratio and hence well-developed anisotropy can be prepared, without formation of secondary particles, by dispersing expanded graphite particles into a liquid and then exposing them to ultrasonic waves. Articles molded of the resulting foliated fine graphite particles exhibit high electrical conductivity and thermal conductivity.

12 Claims, No Drawings

FOLIATED FINE GRAPHITE PARTICLES AND METHOD FOR PREPARING SAME

This is a continuation of application Ser. No. 07/460,096 filed Feb. 2, 1990, now abandoned.

TECHNICAL FIELD

This invention relates to foliated fine graphite particles which have a high aspect ratio and hence well-developed anisotropy and can be used as a highly functional graphite material in wide applications, as well as a method for preparing the same.

BACKGROUND ART

Graphite materials have excellent properties such as electrical conductivity, lubricity, corrosion resistance and heat resistance, and are being used in wide applications requiring electrically conductive, heat-resistant and/or corrosion-resistant materials. In these applications, graphite materials are usually used in the form of molded articles consisting of graphite alone or a combination of graphite and other materials. Among others, graphite powder occupies an important position as a material for the formation of such molded articles and as a solid lubricant.

Graphite powder for use in these applications, especially when incorporated into rubber and synthetic resins to impart thereto functional properties such as electrical conductivity and thermal conductivity, should preferably comprise fine particles having a high aspect ratio because they can be uniformly dispersed so as to have many mutual contacts.

In the prior art, graphite powder has usually been prepared by a wet or dry grinding method for mechanically reducing natural or synthetic graphite to powder. However, these grinding methods for preparing graphite powder involve several problems. Specifically, it is difficult to reduce graphite to fine particles because the crystallinity of graphite is so developed that slip occurs between graphite crystal layer planes. Even if the grinding power is increased or the grinding time is prolonged, fine particle having a uniform shape cannot be obtained and, moreover, the grinding efficiency is reduced. On the other hand, where graphite powder is prepared by grinding expanded graphite obtained, for example, by heat treatment of intercalated graphite, it has been difficult to reduce expanded graphite to fine particles according to common grinding methods using direct mechanical loads or impacts effected by a mortar with a pestle, a grinder or the like. Specifically, the crystal layer planes of expanded graphite tend to become oriented perpendicularly to the direction of the loads or impacts, resulting in the formation of thin films. Moreover, expanded graphite particles are so soft that they are easily squashed and pressed into a plate-like mass. Furthermore, expanded graphite particles having a bulk density of 0.003 to 0.006 $g/cm^3$ are so bulky and light that they tend to scatter during the grinding process. In order to solve these problems, Japanese Patent Laid-Open No. 127612/'86 (DERWENT abstract 86-194944/30) discloses a method for preparing an electrically conductive graphite material wherein expanded graphite is ground while the interstices thereof are impregnated with a liquid or, in addition, the liquid is frozen. This method can solve the problem of particle scattering, but still involves several problems to be solved. Specifically, since this method is based on grinding by direct mechanical impact forces, it is desirable to impregnate the interstices of expanded graphite completely with a liquid, and additional operation therefor is required. Moreover, this method produces considerable noises and vibrations associated with ordinary mechanical grinding, Furthermore, although the expanded graphite is impregnated with a liquid, it is difficult to grind it uniformly. Thus, the resulting particles are not uniform in shape and excessively ground particles tend to cohere or form lumps.

In short, it has been difficult to prepare fine graphite particles having uniformly distributed small sizes and high aspect ratios, according to prior art grinding methods. Thus, fine graphite particles having such a shape has been unknown in the prior art.

DISCLOSURE OF THE INVENTION

In order to solve the above-described problems of the prior art, the present invention provides uniform foliated fine graphite particles having a small diameter and a high aspect ratio, and an excellent method for preparing them easily.

The method of the present invention comprises the steps of dispersing expanded graphite particles into a liquid and comminuting the graphite particles by exposure to ultrasonic waves in the liquid. This method makes it possible to prepare uniform foliated fine graphite particles having a small diameter and a high aspect ratio. More specifically, the method of the present invention involves dispersing expanded graphite particles into a liquid, which causes the liquid serving as a disintegration medium to be present on the outside and inside of the particles. As a result, the walls constituting the particles are subjected to ultrasonic vibrations and the impact of cavitation caused thereby, from the inside and outside of the particles, so that the walls are destroyed to reduce the particles to a finer size. Thus, the expanded graphite particles are directly dispersed into the liquid without requiring any special operation for impregrating the interstices present in the structure of the particles with the liquid, and they are comminuted while being allowed to stand in the liquid. According to this method, foliated fine graphite particles having a thickness of 1 $\mu$m or less, a diameter of 1 to 100 $\mu$m, and an average aspect ratio ranging from several hundreds to several thousands can be prepared with ease.

The present invention brings about the following effects.

(1) Since expanded graphite particles are comminuted while being allowed to stand in a liquid, there is no environmental pollution due to scattering of powder. Moreover, since the particles can be handled in the form of a dispersion, they are easier to handle than powder. If necessary, dry powder can readily be obtained by drying techniques such as evaporation under reduced pressure, and spray drying.

(2) Since disintegrating forces are transmitted through the liquid present on the inside and outside of the expanded graphite particles, relatively uniform particles can be obtained without any risk of being pressed together to form secondary particles, even if an excessive degree of comminution is effected owing to a prolonged treating time or an unduly high power output of the ultrasonic waves.

(3) Since the disintegration medium is a liquid and no mechanical impact force is used, no vibrations or noises associated with prior art grinding methods are produced. Moreover, great safety is secured because a part or device for giving mechanical impacts, such as a hammer or a mortar, is not required.

(4) The foliated fine graphite particles thus obtained are highly crystalline fine graphite particles having a high aspect ratio, showing no tendency to cohere, and being uniform in shape. Thus, they are useful as a material having excellent properties such as high electrical conductivity and thermal conductivity.

BEST MODE FOR CARRYING OUT THE INVENTION

The present invention is more specifically described hereinbelow.

In the present invention, expanded graphite particles having a well-developed honeycomb structure along the graphite crystal layer planes are used as the starting material. Although no particular limitation is placed on the method of making such expanded graphite particles, this can be done, for example, by the per se known method which comprises treating graphite particles (such as particles of natural flake graphite, kish graphite or highly crystalline pyrolytic graphite) with a mixture of sulfuric acid and nitric acid to form intercalated graphite and then expanding it by heat treatment. It is preferable to use expanded graphite particles having a rate of expansion of 50 or greater. The bulk specific gravity of the expanded graphite particles used may vary according to the method of making them and the manner of storage, transportation or handling thereof. However, judging from the ease of permeation of liquids and the ease of comminution, the expanded graphite particles should preferably have a bulk density of 0.01 g/cm$^3$ or less and more preferably 0.008 g/cm$^3$ or less.

First of all, the expanded graphite particles are dispersed into a liquid. On this occasion, no particular pretreatment for impregnating the honeycomb structure with the liquid is needed.

The liquid used in the present invention should be one which permits effective comminution of the graphite particles. More specifically, it is preferable to use a liquid which serves as a medium causing heavy cavitation under the action of ultrasonic waves or highly transmissive of ultrasonic waves, has low viscosity, surface tension and specific gravity, and exhibits good wetting properties for expanded graphite particles (e.g., high lipophilicity) so as to permeate into the particles easily. Preferred examples of the liquid include ketones such as acetone and methyl ethyl ketone; alcohols such as methanol, ethanol, propanol and butanol; and aromatic hydrocarbons such as benzene and toluene. It is to be understood, however, that the liquids usable in the present invention are not limited thereto and the method of the present invention can also be carried out by using water, for example. Such liquids may be used alone or in admixture of two or more. If necessary, surface active agents and the like may be added thereto.

Although the amount of liquid used may vary according to the type of the expanded graphite particles, the properties of the liquid, and the affinity of the liquid for expanded graphite, comminution can be effected by using the liquid in an amount just enough to soak the expanded graphite particles therein. However, judging from the ease of comminution, it is preferable to use the liquid in rather large amounts. Although the actual amount of liquid used may be suitably determined according to the operating conditions, the liquid is usually used in an amount equal to about 1.5 to 100 times the volume of the expanded graphite particles.

After the expanded graphite particles are soaked and dispersed into the aforesaid liquid, the resulting mixture is subjected to ultrasonic vibrations. Thus, according to the frequency of the ultrasonic vibrations, condensed and rarefied regions are produced in the interior of the expanded graphite particles and in the liquid around them, which leads to the occurrence of the so-called cavitation in which minute cavities are formed and collapsed repeatedly. If such cavitation is caused to occur under specific conditions, the impact of instantaneous pressure caused by the collapse of cavities successively destroy the thin graphite walls constituting the honeycomb structure of the expanded graphite particles, resulting in their reduction to foliated fine particles. The frequency of the ultrasonic waves used for this purpose is not critical, and frequencies of about 28 to 50 kHz as commonly used in ultrasonic cleaners and the like will serve satisfactorily. However, the actual frequency may be determined according to the type of liquid used, the type of expanded graphite particles used, and the like. As the power output of the ultrasonic waves is increased, the comminution time becomes shorter and the resulting particles tend to become finer. Accordingly, the size distribution and shape of the resulting particles can be controlled by varying the power output and the treating time. The ultrasonic treatment can be carried out under atmospheric or super-atmospheric pressure. The treating temperature is not critical, so long as it is lower than the boiling point of the liquid. Although the duration of the ultrasonic treatment may vary according to the quality of the starting material (expanded graphite particles), the treating conditions, the desired particle size of graphite powder, and the like, it usually ranges from about 10 minutes to about 6 hours.

The above-described ultrasonic treatment makes it possible to comminute the expanded graphite particles and thereby produce foliated fine graphite particles characterized in that more than 90% of the particles have a thickness of 1 $\mu$m or less, a diameter within the range of 1 to 100 $\mu$m, and an average aspect ratio ranging from several hundreds to several thousands. Moreover, there is no risk of the fine particles cohering again to form secondary particles, as encountered in grinding by mechanical loads or impacts. The above-described operating conditions, such as the type of liquid used, the frequency and power output of the ultrasonic waves, and the treating time, may be suitably determined according to the desired diameter, shape, size distribution and other characteristics of foliated fine graphite particles.

After completion of the ultrasonic treatment, the resulting dispersion of foliated fine graphite particles may be used as such or in the form of a concentrate obtained by removing the liquid to an appropriate degree. Alternatively, by removing the liquid completely according to common drying techniques such as vacuum drying, hot-air drying and spray drying, the foliated fine graphite particles can also be used in the form of dry powder.

As described above, the foliated fine graphite particles obtained by the method of the present invention have a high aspect ratio, show no tendency to cohere, and are uniform in shape, and articles molded of these particles have marked anisotropy and high electrical conductivity. Owing to such excellent characteristics, these foliated fine graphite particles can be used in a wide variety of applications. Among others, particles having a thickness of 1 μm or less and a diameter of 1 to 70 μm exhibit good dispersibility as evidenced by slow sedimentation of the particles in a dispersion. Moreover, they also have good compatibility with highly viscous materials, so that they can be advantageously used for incorporation into paints, rubber, plastics and the like. When freed of liquid, these foliated fine graphite particles take the form of an easily handleable powder and are hence suitable for use in wide applications, for example, as an additive for various molded articles and composite materials.

Owing to their unique shape, these foliated fine graphite particles exhibit marked anisotropy with respect to electrical conductivity. Especially when a load is applied to these particles, they are oriented to produce high electrical conductivity in a direction perpendicular to that of the load. Accordingly, these particles can be suitably used for the purpose of imparting electrical conductivity.

The foliated fine graphite particles obtained by the method of the present invention have a higher aspect ratio than graphite particles obtained by prior art methods. Accordingly, when used as an electrically conductive filler for imparting electrical conductivity to resins, rubber, ceramics and the like, the foliated fine graphite particles give a greater number of particles and a greater combined length of particles, as compared with the same weight of conventional graphite powder. Thus, the foliated fine graphite particles, when dispersed in a matrix, have more mutual contacts and are hence more effective in imparting electrical conductivity.

The present invention is further illustrated by the following examples. In these examples, bulk densities were determined by filling a 10-ml measuring cylinder with a sample, tapping the cylinder against a rubber plate until the top surface of the sample substantially ceased to fall, and calculating the bulk specific gravity of the sample on the basis of the measured volume thereof.

EXAMPLES

Example 1

Natural flake graphite produced in China was treated with a mixture of 9 parts by weight of sulfuric acid and 1 part by weight of nitric acid to form intercalated graphite. This intercalated graphite was heat-treated at 800° C. for 10 minutes in an atmosphere of nitrogen to obtain expanded graphite particles having a bulk density of 0.004 g/cm$^3$. Then, 1 g of the expanded graphite particles were mixed with and soaked in 400 g of acetone and exposed to ultrasonic waves having a frequency of 28 kHz and a power output of 150 W for 2 hours. The resulting dispersion of fine graphite particles was freed of acetone by evaporation under reduced pressure, and then dried in a drying oven at 110° C. for 1 hour to obtain about 1 g of graphite powder. This graphite powder consisted of foliated graphite particles having a bulk density of 0.04 g/cm$^3$, a thickness of 0.1 μm or less, and a diameter of 1 to 60 μm, and more than 95% of the particles had an aspect ratio of 400 to 7,000. The carbon content of this powder was 99.02%. When its crystal structure was analyzed by X-ray diffractometry, it was found that this powder had a nearly ideal hexagonal graphite crystal structure as shown in Table 1.

TABLE 1

Crystal structure analyzed by X-ray diffractometry (according to the procedure proposed by the No. 117 Committee of the Japan Society for the Promotion of Science)

| Index of plane (hkl) | Lattice constant (Å) | Lattice spacing, d (Å) | Crystallite, L (Å) |
|---|---|---|---|
| 002* | $C_o$ = 6.70 | 3.35 | 690 |
| 004 | $C_o$ = 6.70 | 3.35 | — |
| 110 | $a_o$ = 2.46 | 1.23 | — |
| Hexagonal graphite (for reference) | $C_o$ = 6.708, $a_o$ = 2.461 | | |

*Direction of lamination (Standard substance: Si)

Example 2

Natural flake graphite produced in China was treated with a mixture of 11 parts by weight of sulfuric acid and 1 part by weight of nitric acid to form intercalated graphite. This intercalated graphite was rapidly heated to 800° C. in an atmosphere of nitrogen and held at that temperature for 30 minutes to obtain expanded graphite particles having a bulk density of 0.003 g/cm$^3$. Then, 0.1 g of the expanded graphite particles were dispersed into 50 ml of each of the liquids shown in Table 2 and comminuted by exposing them to ultrasonic waves having a frequency of 50 kHz and a power output of 600 W for 2 hours. When the comminuted particles were examined by means of a scanning electron microscope, it was found that they had been reduced to foliated particles having a thickness of 1 μm or less and a diameter within the range shown in Table 2, and more than 90% of the particles had an aspect ratio of 400 to 6,500.

TABLE 2

| | No. 1 | No. 2 | No. 3 | No. 4 | No. 5 |
|---|---|---|---|---|---|
| Liquid | Acetone | Benzene | Methanol | Ethanol | Water |
| Particle diameter (μm) | 10–30 | 20–60 | 10–30 | 10–30 | 20–60 |

Comparative Example 1

0.1 g of the same expanded graphite particles as used in Example 2 were dispersed into 100 ml of acetone or water, and the resulting dispersion was treated in a mixer type pulverizer. When the pulverized particles were examined by means of a scanning electron microscope, the diameters of these particles were considerably larger than those obtained by ultrasonic comminution in accordance with the present invention, as can be seen from Table 3. Moreover, the particles showed wide variations in shape and some of them were found to be laminated into a thickened state or pressed into lumps. It was impossible to reduce these particles to a smaller size by extending the treating time further.

TABLE 3

| | Liquid | Treating time (hr) | Particle diameter (μm) |
|---|---|---|---|
| No. 1 | Acetone | 0.5 | >200 |
| No. 2 | " | 1.0 | 50–150 |
| No. 3 | " | 2.0 | 50–150 |
| No. 4 | " | 5.0 | 50–150 |
| No. 5 | Water | 2.0 | >200 |

Example 3

Powder sample A having an average particle diameter of 20 μm and an aspect ratio of 100 to 5,000 and powder sample B having an average particle diameter of 40 μm and an aspect ratio of 100 to 7,000 were produced by repeating the procedure of Example 1, except that the comminution time was altered. Then, molded pieces were made by applying a predetermined load to these powder samples. Using these molded pieces, specimens measuring 15 mm (width)×2 mm (thickness)×50 mm (length) were prepared and tested for volume resistivity. The results thus obtained are shown in Table 4.

For purposes of comparison, commercially available graphite powders C and D were tested in the same manner as described above, and the results thus obtained are also shown in Table 4. It can be seen that the foliated graphite powders obtained by the method of the present invention exhibited high electrical conductivity, especially in a direction perpendicular to that of the load.

TABLE 4

| Sample | | Foliated graphite powders of the present invention | | Prior art graphite powders | |
|---|---|---|---|---|---|
| | | A | B | C | D |
| Average particle diameter (μm) | | 20 | 40 | 2.5 | 7 |
| Aspect ratio | | 100–5,000 | 100–7,000 | 25–250 | 70–700 |
| Applied pressure (kgf/cm$^2$) | | 6.0 | 500 | 6.0 | 6.0 | 6.0 |
| Volume resistivity (Ω·cm) | Direction of load (ρ⊥) | 2.70 | 11.4 | 4.16 | 3.42 | 2.50 |
| | Perpendicular direction (ρ11) | 7.58 × 10$^{-4}$ | 5.18 × 10$^{-4}$ | 7.51 × 10$^{-4}$ | 1.00 × 10$^{-2}$ | 2.01 × 10$^{-2}$ |
| ρ⊥/ρ11 | | 3.56 × 10$^3$ | 2.19 × 10$^4$ | 5.54 × 10$^3$ | 3.42 × 10$^2$ | 1.24 × 10$^2$ |

Example 4

Each of graphite powders A, C and D tested in Example 3 was added to and mixed with a two-pack type silicone rubber (KE-12; a product of Shin-Etsu Silicone Co.). This mixture was press-molded and cured to obtain a molded piece, which was tested for electrical conductivity. More specifically, a specimen measuring 5 mm×15 mm×50 mm was prepared and its electrical conductivity was measured with a voltmeter having a measuring range of 0.01 to 12 V and an ammeter having a detection limit of 0.01 A. The results thus obtained are shown in Table 5. The foliated graphite powder of the present invention exhibited high electrical conductivity at a content of 7%, whereas the commercially available prior art graphite powders exhibited no electrical conductivity.

TABLE 5

(Measuring voltage: 12 V)

| | Type | A | C | D |
|---|---|---|---|---|
| Graphite powder used | Bulk density (g/cm$^3$) | 0.015 | 0.225 | 0.256 |
| Content (%) [= parts by weight of graphite powder per 100 parts by weight of matrix] | | 7 | 7 | 7 |
| Volume resistivity of molded rubber piece (Ω·cm) | | 3.4 | No conduction | No conduction |

Exploitability in Industry

The foliated fine graphite particles obtained by the method of the present invention can be widely used, either in the form of a dispersion or powder, as a filler for molded graphite articles such as electrodes, an additive for imparting electrical conductivity, and a solid lubricant. Among others, they are especially suitable for use as an additive for paints and resins, an electrically conductive material, and an additive for electromagnetic shield housings of electronic equipment.

We claim:

1. A method for preparing foliated fine graphite particles of substantially uniform shade which comprises the steps of (a) dispersing expanded graphite particles having a honeycomb structure along the graphite crystal layer planes, a rate of expansion of 50 or greater and a bulk density of 0.01 g/cm$^3$ or less in from 1.5 to 100 times the volume of the expanded graphite of a liquid which has low viscosity, surface tension and specific gravity and which exhibits good wetting properties for the expanded graphite particles and, while the expanded graphite particles are in the liquid, (b) imparting ultrasonic energy to both the liquid and the interior of the graphite particles, whereby the particle walls are subjected to ultrasonic vibrations and the impact of cavitation caused thereby from both inside and the outside of the particles, for a period of time effective to comminute by ultrasonic energy alone more than 90% of the starting graphite particles into foliated fine particles which have a substantially uniform shape, a thickness of 1 μm or less and a diameter of 1 to 100 μm and an aspect ratio of from 100 to 7,000.

2. A method as claimed in claim 1, wherein the liquid is selected from the group consisting of water, ketones, alcohols and aromatic compounds.

3. A method as claimed in claim 1, wherein the ultrasonic waves have a frequency of 28 to 50 kHz.

4. A method as claimed in claim 1, wherein the thus-foliated graphite particles are thereafter recovered from the liquid as a powder.

5. A method as claimed in claim 1, wherein the liquid is selected from the group consisting of water, ketones, alcohols and aromatic compounds; wherein the ultrasonic waves have a frequency of 28 to 50 kHz; the starting expanded graphite particles have a bulk density of 0.008 g/cm$^3$ or less and they are exposed to the ultrasonic waves until more than 90% of the particles have a diameter of 1 to 70 μm; and wherein the thus-foliated graphite particles are thereafter recovered from the liquid as a powder.

6. The method of claim 1, wherein the solvent is methanol, ethanol, propanol or butanol.

7. The method of claim 1, wherein the solvent is acetone or methyl ethyl ketone.

8. The method of claim 1, wherein the solvent is benzene or toluene.

9. The method of claim 1, conducted in the absence of mechanical impact force.

10. A graphite powder consisting essentially of fine foliated expanded graphite particles more that 90% of which have a substantially uniform shape, a thickness of 1 μm or less, a diameter of 1 to 100 μm and an aspect ratio of from 100 to 7,000.

11. A dispersion of a graphite powder of claim 10 in an organic liquid which has low viscosity, surface tension and specific gravity and which has good wetting properties for the graphite particles.

12. A foliated graphite powder of claim 10, wherein the particles have a diameter of about 20 to 40 μm of which more than 95% have an aspect ratio of 400 to 7,000 and a nearly ideal hexagonal graphite crystal structure.

* * * * *

UNITED STATES PATENT AND TRADEMARK OFFICE
CERTIFICATE OF CORRECTION

PATENT NO. : 5,330,680
DATED : July 19, 1994
INVENTOR(S) : Kouji SAKAWAKI et al.

It is certified that error appears in the above-indentified patent and that said Letters Patent is hereby corrected as shown below:

Title Page, Item [30], Under Foreign Application Priority Data:

Insert -- PCT/JP89/00576   June 6, 1989 --.

Signed and Sealed this

Sixth Day of December, 1994

Attest:

BRUCE LEHMAN

Attesting Officer      Commissioner of Patents and Trademarks